(12) United States Patent
He et al.

(10) Patent No.: US 11,997,591 B2
(45) Date of Patent: May 28, 2024

(54) ENHANCED INITIAL ACCESS PROCEDURES IN WIRELESS COMMUNICATION

(71) Applicant: APPLE INC., Cupertino, CA (US)

(72) Inventors: Hong He, Cupertino, CA (US); Chunhai Yao, Beijing (CN); Chunxuan Ye, San Diego, CA (US); Dawei Zhang, Cupertino, CA (US); Haitong Sun, Cupertino, CA (US); Jie Cui, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 394 days.

(21) Appl. No.: 17/593,566

(22) PCT Filed: May 15, 2020

(86) PCT No.: PCT/CN2020/090522
§ 371 (c)(1),
(2) Date: Sep. 21, 2021

(87) PCT Pub. No.: WO2021/227014
PCT Pub. Date: Nov. 18, 2021

(65) Prior Publication Data
US 2022/0312303 A1    Sep. 29, 2022

(51) Int. Cl.
*H04W 16/14* (2009.01)
*H04W 48/16* (2009.01)
*H04W 72/0453* (2023.01)

(52) U.S. Cl.
CPC ........... *H04W 48/16* (2013.01); *H04W 16/14* (2013.01); *H04W 72/0453* (2013.01)

(58) Field of Classification Search
CPC .............................. H04W 48/16; H04W 16/14
See application file for complete search history.

(56) References Cited

U.S. PATENT DOCUMENTS

| 11,057,934 B2 * | 7/2021 | Abedini ................. H04W 72/23 |
| 2017/0181040 A1 | 6/2017 | Chandwani et al. |
| 2020/0092779 A1 * | 3/2020 | Jung ..................... H04W 36/14 |

FOREIGN PATENT DOCUMENTS

| CN | 106454710 A | 2/2017 |
| CN | 106797569 A | 5/2017 |

(Continued)

OTHER PUBLICATIONS

Mediatek Inc., "Design Considerations on LAA design", R1-150575, 3GPP TSG RAN WG1 Meeting #80, Athens, Greece, Agenda Item 7.2.3.3, Feb. 9-13, 2015, 6 pages.

(Continued)

*Primary Examiner* — Michael T Vu
(74) *Attorney, Agent, or Firm* — Dorsey & Whitney LLP

(57) ABSTRACT

Disclosed are techniques for differentiating between licensed and unlicensed bands in a common portion of frequency spectrum to facilitate initial access in a fifth generation (5G) new radio (NR) wireless communication system having an NR node. The techniques include an NR generating and UE processing frequency configuration information indicating whether the common portion of frequency spectrum is allocated as a licensed band or an unlicensed band to enable a determination that the frequency spectrum is configured as the licensed band or unlicensed band and thereby facilitate initial access.

18 Claims, 16 Drawing Sheets

(56) References Cited

FOREIGN PATENT DOCUMENTS

| CN | 109451868 A | 3/2019 |
| CN | 111669790 A | 9/2020 |
| WO | 2020068995 A1 | 4/2020 |
| WO | 2021148356 A1 | 7/2021 |

OTHER PUBLICATIONS

PCT/CN2020/090522, International Search Report and Written Opinion, Feb. 18, 2021, 10 pages.
Ericsson, "Signaling of Q for NR-U", R2-2000338, 3GPP TSG-RAN WG2 #109-e, Electronic Meeting, Agenda Item 6.2.3.2, Feb. 24-Mar. 6, 2020, 11 pages.
Moderator (Qualcomm Incorporated), "Moderator's summary of initial access signals and channels for NR-U", R1-2002734, 3GPP TSG RAN WG1 Meeting #100bis-e, Agenda Item 7.2.2.1.1, Apr. 20-30, 2020, 17 pages.

* cited by examiner

```
MIB ::= SEQUENCE {
    systemFrameNumber          BIT STRING (SIZE (6)),
    subCarrierSpacingCommon    ENUMERATED {scs15or60, scs30or120},
    ssb-SubcarrierOffset       INTEGER (0..15),
    dmrs-TypeA-Position        ENUMERATED {pos2, pos3},
    pdcch-ConfigSIB1           INTEGER (0..255),
    cellBarred                 ENUMERATED {barred, notBarred},
    intraFreqReselection       ENUMERATED {allowed, notAllowed},
    unlicensed                 BIT STRING (SIZE (1))
```

FIG. 2

```
-- ASN1START
-- TAG-FREQUENCYINFODL-START
FrequencyInfoDL ::=       SEQUENCE {
    absoluteFrequencySSB      ARFCN-ValueNR OPTIONAL, -- Cond SpCellAdd
    frequencyBandList                   MultiFrequencyBandListNR,
    absoluteFrequencyPointA             ARFCN-ValueNR,
    scs-SpecificCarrierList             SEQUENCE (SIZE (1..maxSCSs)) OF SCS-
    SpecificCarrier,
    FrequencyType             ENUMERATED {licensed, unlicensed}
    ..
}
-- TAG-FREQUENCYINFODL-STOP
-- ASN1STOP
```

$$C_{init} = 2^{14}\left(\bar{i}_{SSB} + 1 + (k)\left(\lfloor N_{ID}^{cell}/4 \rfloor + 1\right)\right) + 2^9\left(\bar{i}_{SSB} + 1\right) + \left(N_{ID}^{cell} \bmod 4\right)$$

$k = 0$ for licensed frequency.

$k = 1$ for unlicensed frequency.

FIG. 7

```
MIB ::= SEQUENCE {
    systemFrameNumber           BIT STRING (SIZE (6)),
    subCarrierSpacingCommon     ENUMERATED {scs15or60, scs30or120},
    ssb-SubcarrierOffset        INTEGER (0..15),
    dmrs-TypeA-Position         ENUMERATED {pos2, pos3},
    pdcch-ConfigSIB1            INTEGER (0..255),
    cellBarred                  ENUMERATED {barred, notBarred},
    intraFreqReselection        ENUMERATED {allowed, notAllowed},
    spare                       BIT STRING (SIZE (1))
}
```

FIG. 9

ENHANCED INITIAL ACCESS PROCEDURES IN WIRELESS COMMUNICATION

TECHNICAL FIELD

This application relates generally to wireless communication systems, and more specifically to techniques facilitating access to unlicensed bands in new radio (NR) deployments.

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or NR (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will appreciate that these frequency ranges, which are provided by way of example, may change from time to time or from region to region.

Disclosed are techniques for differentiating between licensed and unlicensed bands in a common portion of frequency spectrum to facilitate initial access in a 5G NR wireless communication system having an NR node. The techniques include an NR generating and UE processing frequency configuration information indicating whether the common portion of frequency spectrum is allocated as a licensed band or an unlicensed band to enable a determination that the frequency spectrum is configured as the licensed band or unlicensed band and thereby facilitate initial access.

Additional aspects and advantages will be apparent from the following detailed description of embodiments, which proceeds with reference to the accompanying drawings.

BRIEF DESCRIPTION OF THE DRAWINGS

To easily identify the discussion of any particular element or act, the most significant digit or digits in a reference number refer to the figure number in which that element is first introduced.

FIG. 2 is an annotated Radio Resource Control (RRC) parameter specification for a Master Information Block (MIB), in accordance with one embodiment.

FIG. 5 is an annotated RRC parameter specification for a FrequencyInfoDL information element (IE), in accordance with one embodiment.

FIG. 7 is an initialization value portion of a Demodulation Reference Signal (DMRS) sequence generation equation, in accordance with one embodiment.

FIG. 9 is an annotated RRC parameter specification for a MIB, in accordance with one embodiment.

DETAILED DESCRIPTION OF EMBODIMENTS

In general, this disclosure describes techniques to facilitate access to unlicensed bands in NR deployments. First, FIG. 1 through FIG. 9 describe several embodiments for MIB interoperation, and for Type0-CSS monitoring determination, that allow a UE to determine whether the spectrum is a licensed band or unlicensed (or shared spectrum) band.

Figure 15:
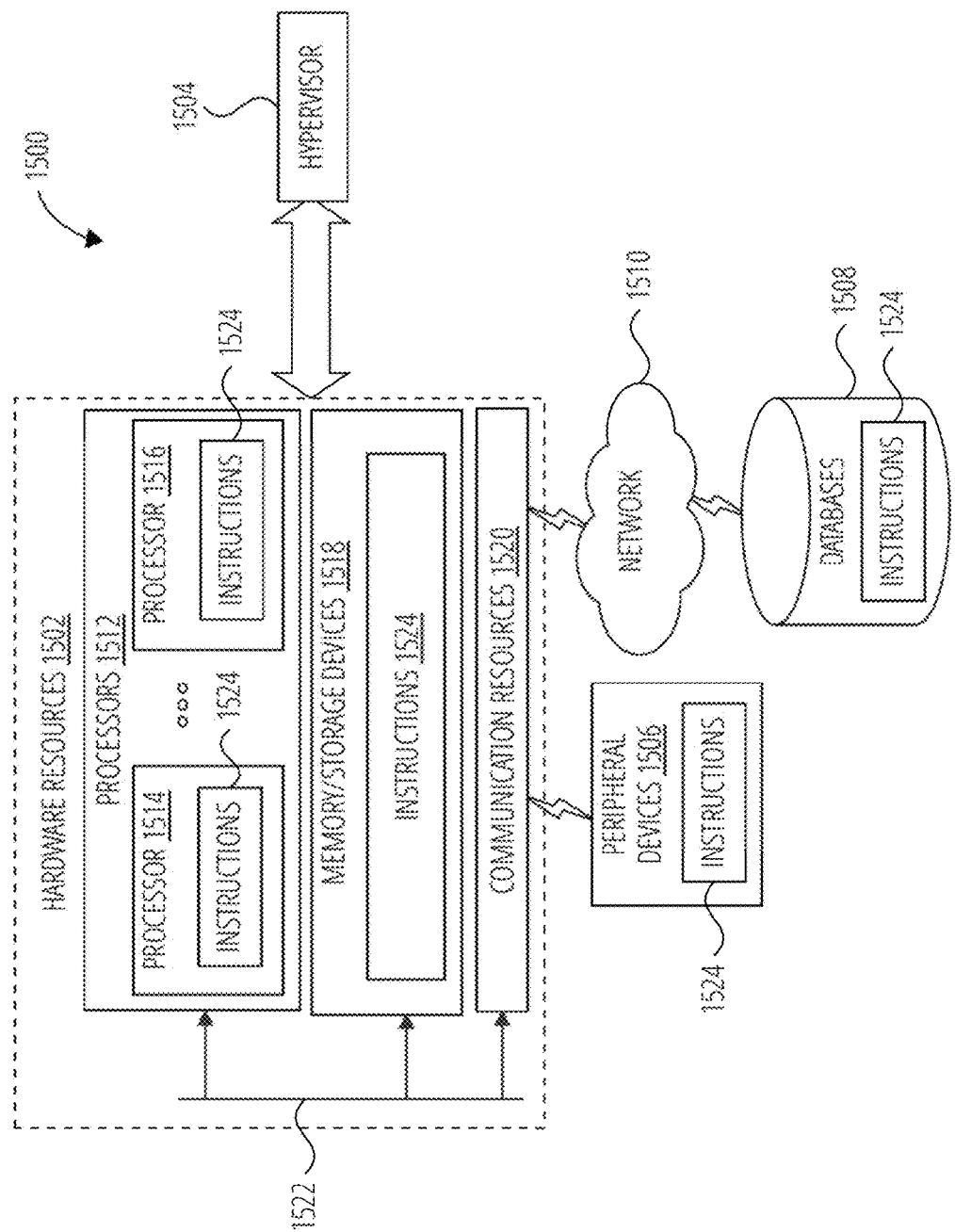
FIG. 15 illustrates components, in accordance with one embodiment.
Figure 16:
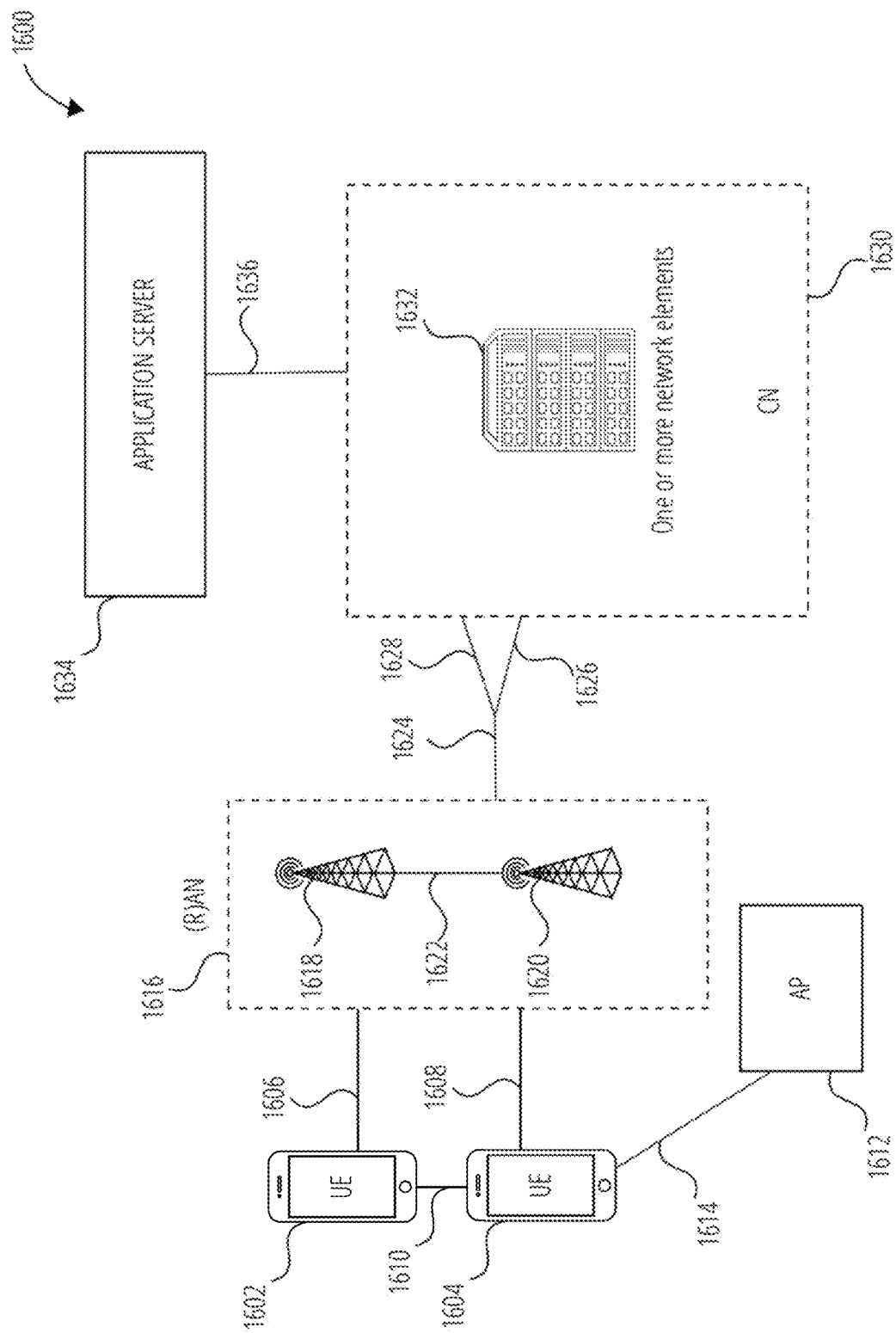
FIG. 16 illustrates a system, in accordance with one embodiment.

Second, FIG. 10 through FIG. 14 describe techniques to optimize PRACH transmission on an unlicensed band. Third, FIG. 15 and FIG. 16 provide additional information about systems and devices implementing the disclosed techniques.

Figure 1:
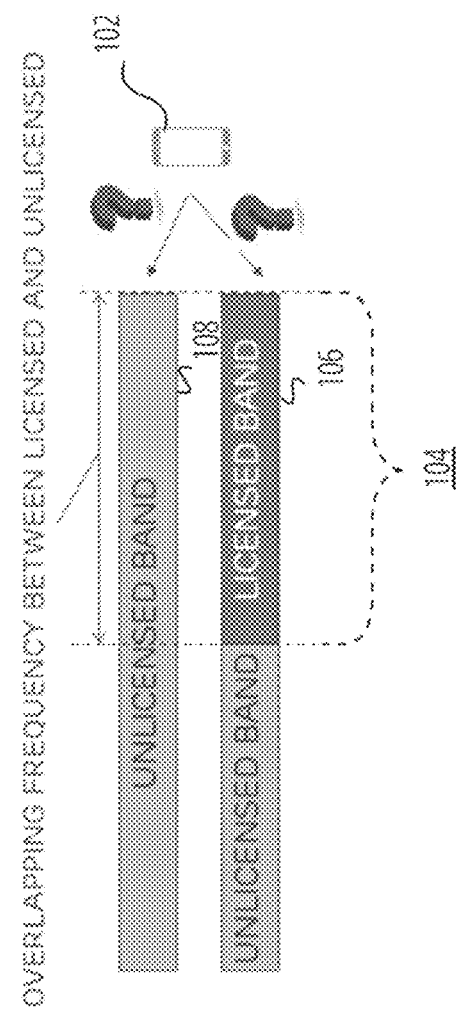
FIG. 1 is a frequency spectrum diagram showing overlapping frequency spectrum between licensed and unlicensed bands.

With reference to FIG. 1, to achieve the International Mobile Telecommunications (IMT)-2020 objectives concerning peak data rates, one Release (Rel)-16 Work Item RP-182878 titled, "NR-based Access to Unlicensed Spectrum," was approved by 3GPP RAN plenary meeting to consider use of the unlicensed spectrum (i.e., shared spectrum) for 5G NR system operation as one complementary source of spectrum. For 5G NR operation in unlicensed spectrum (NR-U), depending on operation in licensed bands versus operation with shared spectrum channel access, different sets of tables were agreed to be used for UEs in the initial access procedure for monitoring Type 0 Physical Downlink Control Channel (PDCCH) Common Search Space (CSS) (Type0-PDCCH CSS) sets.

The reinterpretation of bits in the MIB, in combination with the different set of tables, imply that the operating band determines whether the UE should assume the legacy interpretation of the MIB or the new interpretation for determination of Type®-PDCCH CSS sets to receive the SIB1 information. This mechanism is suitable for a frequency band without overlapping between licensed and unlicensed frequency, e.g., the 5 GHz band (i.e., Band n46).

FIG. 1 shows an NR 5G operating environment 100 in which a UE 102 designed for global operation is presented with ambiguity in MIB interpretation since one frequency spectrum 104 (e.g., upper part of 6 GHz band) is allocated as a licensed band 106 in one geographic region (e.g., Europe) and is allocated an unlicensed band 108 in another geographic region (e.g., US). The ambiguity arises because, during initial access, UE 102 has no priori knowledge of whether to employ a Rel-15 MIB interpretation for licensed band 106 or a Rel-16 MIB interpretation that is newly defined for unlicensed band 108. Thus, this disclosure addresses the aforementioned issue to facilitate operation of an NR-U system on an overlapping band.

According to a first embodiment, FIG. 2 shows RRC parameters 200 defining a MIB 202. MIB 202 includes a bitfield 204 used to indicate whether a UE is accessing licensed or unlicensed frequency. Bitfield 204 acts as frequency configuration information and replaces the previous reserved (i.e., spare) bitfield in conventional MIBs, which carried no such information about whether licensed or unlicensed frequency is configured for the wireless communication.

In one example design, when bitfield 204 is set to a value of zero (or some other Boolean TRUE/FALSE logical value), it indicates whether spectrum is licensed. Likewise, if bitfield 204 is set to a value of one (i.e., the opposite Boolean TRUE/FALSE logical value), it indicates spectrum is an unlicensed band or shared spectrum (generally referred to as unlicensed).

Figure 3:
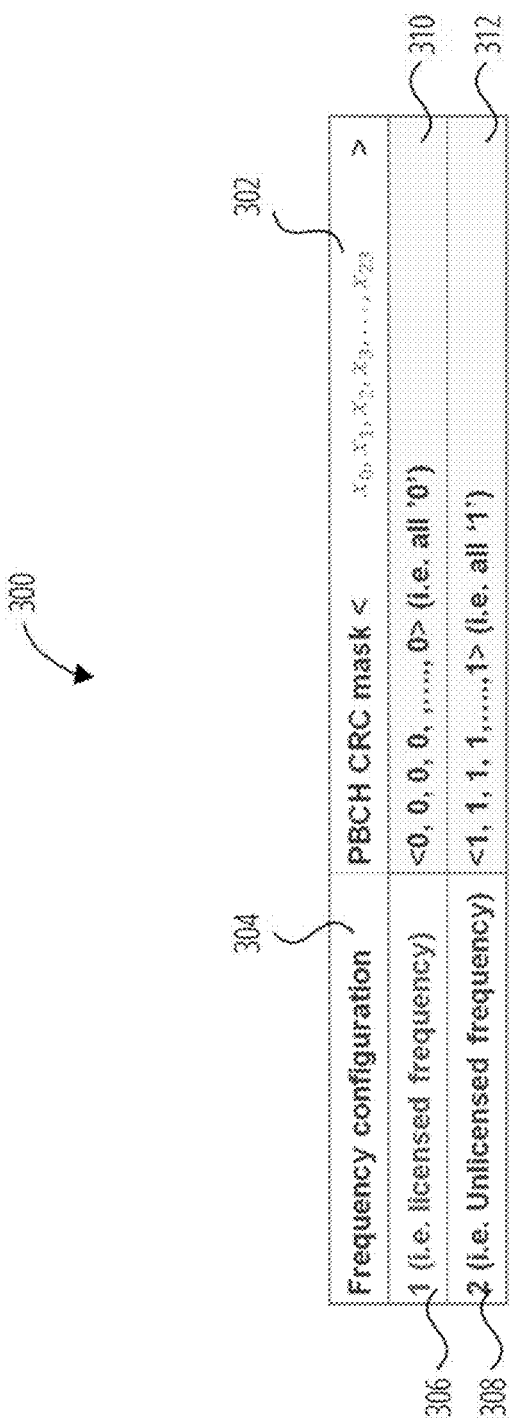
FIG. 3 is a table showing a Cyclic Redundancy Code (CRC) mask for Physical Broadcast Channel (PBCH), according to one embodiment.

According to a second embodiment, FIG. 3 shows an example in which frequency information is provided by means of dedicated sequence used to scramble 24-bit PBCH CRC bits. For example, an item 300 shows a CRC mask 302 for PBCH. Depending on a frequency configuration 304 (i.e., a licensed frequency configuration 306 or an unlicensed frequency configuration 308), the values of CRC mask 302 change between, respectively, first CRC mask sequence values 310 and second CRC mask sequence values 312. Accordingly, after parity bits are computed and attached to the BCH transport block, the following CRC bits:

$$p_0, p_1, p_2, p_3, \ldots, p_{23}$$

are then scrambled according to frequency configuration 304 (i.e., licensed frequency configuration 306 or unlicensed frequency configuration 308) with corresponding values of CRC mask 302:

$$x_0, x_1, x_2, x_3, \ldots, x_{23}$$

by using the following operation:

$$c_k = (p_k + x_k) \bmod 2, k=0,1,2,3,\ldots,23$$

In one example design, first CRC mask sequence values 310 are all zero and second CRC mask sequence values 312 are all one. Other scrambling functions could be applied in other designs. Thus, the scrambled PBCH CRC bits provide the frequency configuration information to the UE because it can first attempt to decode the PBCH using the first CRC mask sequence values 310. If successful, then the UE determines that it is accessing a licensed band. If unsuccessful, the UE determined it is accessing an unlicensed band and attempt the second CRC mask sequence values 312.

Figure 4:
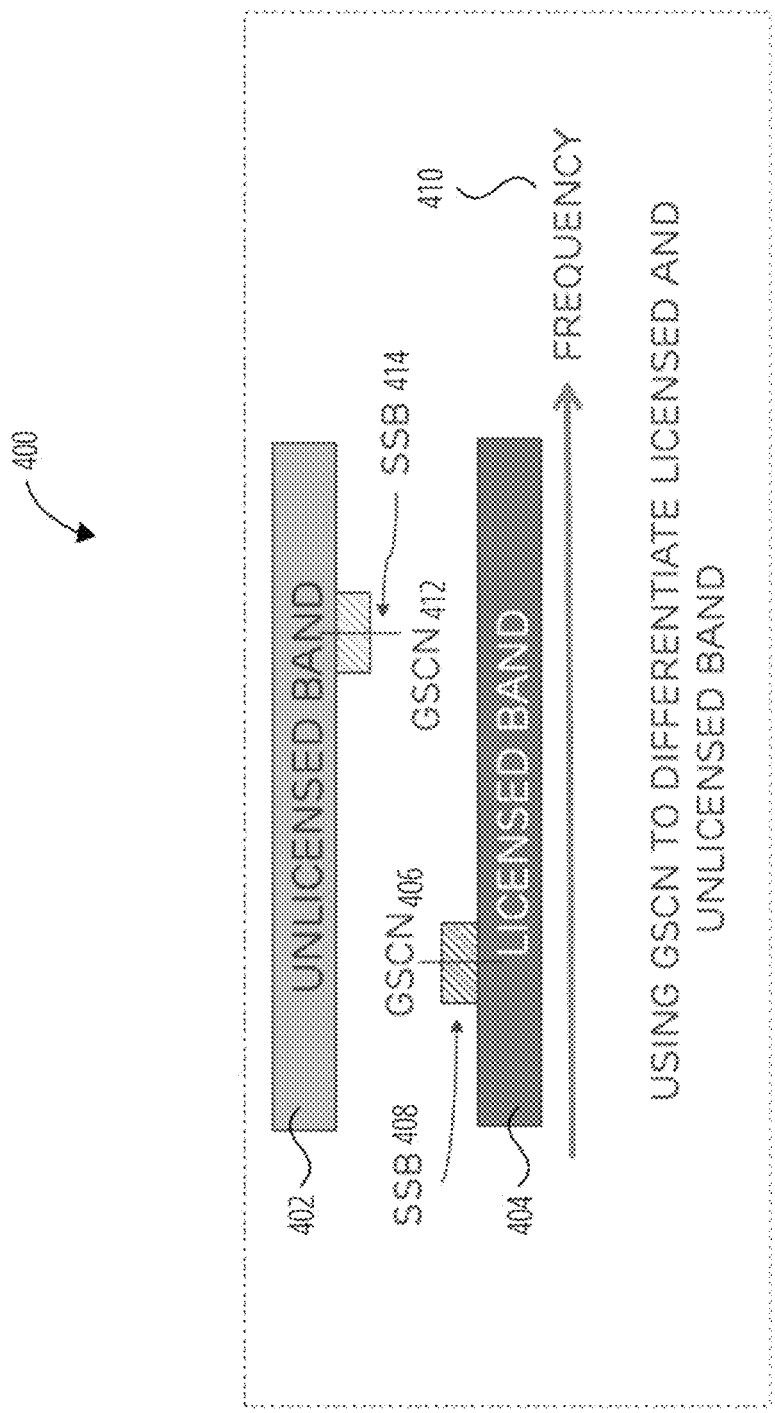
FIG. 4 is a frequency spectrum diagram showing first and second Global Synchronization Channel Numbers (GSCN) at different frequency locations for, respectively, licensed and unlicensed bands.

According to a third embodiment, FIG. 4 shows an NR 5G operating environment 400 in which different non-overlapping GSCNs, having a certain frequency gap therebetween, are defined for differentiating between an unlicensed band 402 and a licensed band 404. Different GSCNs correspond to SSBs used by a UE for system acquisition when explicit signaling of an SSB block position is not present.

As shown in FIG. 4, in one example design, a first GSCN 406 is at a first location of a frequency spectrum 410 and corresponds to a first SSB 408 indicating licensed band 404. Likewise, a second GSCN 412 is at a second location of frequency spectrum 410 and corresponds to a second SSB 414 indicating unlicensed band 402.

According to a fourth embodiment, the frequency configuration, i.e., licensed vs. unlicensed band, is provided by dedicated RRC signaling after a primary cell (PCell) is configured. As shown in FIG. 5, in one example, for a secondary cell (SCell) with overlapping frequency between licensed and unlicensed bands, a FrequencyInfoDL IE 500 of sCellToAddModList (or measurement configurations) provide a frequency type configuration 502.

Figure 6:
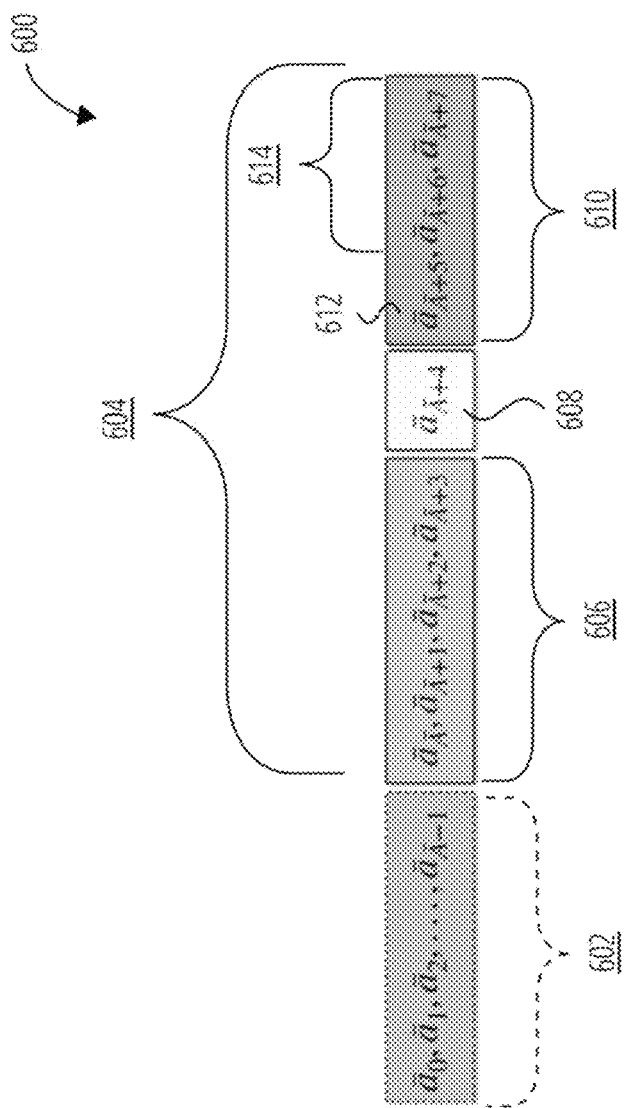
FIG. 6 is a block diagram showing portions of a PBCH payload, in accordance with one embodiment.

According to a fifth embodiment, certain fields in a PBCH are repurposed to indicate the licensed and unlicensed operation for overlapping frequency on FR1. For example, FIG. 6 shows a non-CRC, 32-bit portion of a PBCH payload 600, which omits a 24-bit CRC appended to the PBCH payload to yield 56-bits in total. Specifically, 32-bit portion of a PBCH payload 600 includes a 24-bit BCH data portion 602 followed by eight timing-related bits 604. A first four bits 606 of timing-related bits 604 provide System Frame Number (SFN) information. These first four bits 606 are followed by a half-frame bit 608. Half-frame bit 608 is followed by three configurable bits 610 including a spare bit 612 and reserved bits 614.

$$\bar{a}_{\bar{A}+6}, \bar{a}_{\bar{A}+7}$$

For carrier frequencies above 6 GHz, configurable bits 610 acts as the 6th, 5th, and 4th bits of SSB. In an example design, however, reserved bits 614 have values set in the PBCH payload as follows: equal (1,1) if the frequency is licensed band; otherwise, the corresponding frequency is unlicensed band. The re-purposed of reserved bits 614 is feasible considering the fact that candidate SSB positions on unlicensed band is up to 20. As one consequence, the value of reserved bits 614 is always (1,0) or (0,0) if it is on unlicensed band.

According to a sixth embodiment, a frequency configuration is indicated through a DMRS sequence of PBCH. For example, FIG. 7 shows an initialization value portion of a DMRS sequence generation equation 700 used to generate a new DMRS sequence indicating licensed or unlicensed bands based on the value of a k parameter 702 of initialization value portion of a DMRS sequence generation equation 700. A PBCH DMRS is generated by Pseudo Random Sequence that has $c_{init}$, i.e., initialization value 704. Initialization value 704 is made up of various components like Physical Cell ID, SSB Index and Half Frame Number. That is, by decoding this DMRS, a UE can determine SSB Index and Half Frame, as well as licensed or unlicensed frequency configuration.

In one example design, when k parameter 702 is set to a value of zero (or some other Boolean TRUE/FALSE logical value), it modifies the resulting DMRS so as to indicate the spectrum is licensed. Likewise, if k parameter 702 is set to a value of one (i.e., the opposite Boolean TRUE/FALSE logical value), it indicates spectrum is an unlicensed band.

According to a seventh embodiment, frequency configuration information (indication of licensed or unlicensed) is implicitly signaled based on the relative position of Primary Synchronization Signal (PSS) and Secondary Synchronization Signal (SSS).

Figure 8:
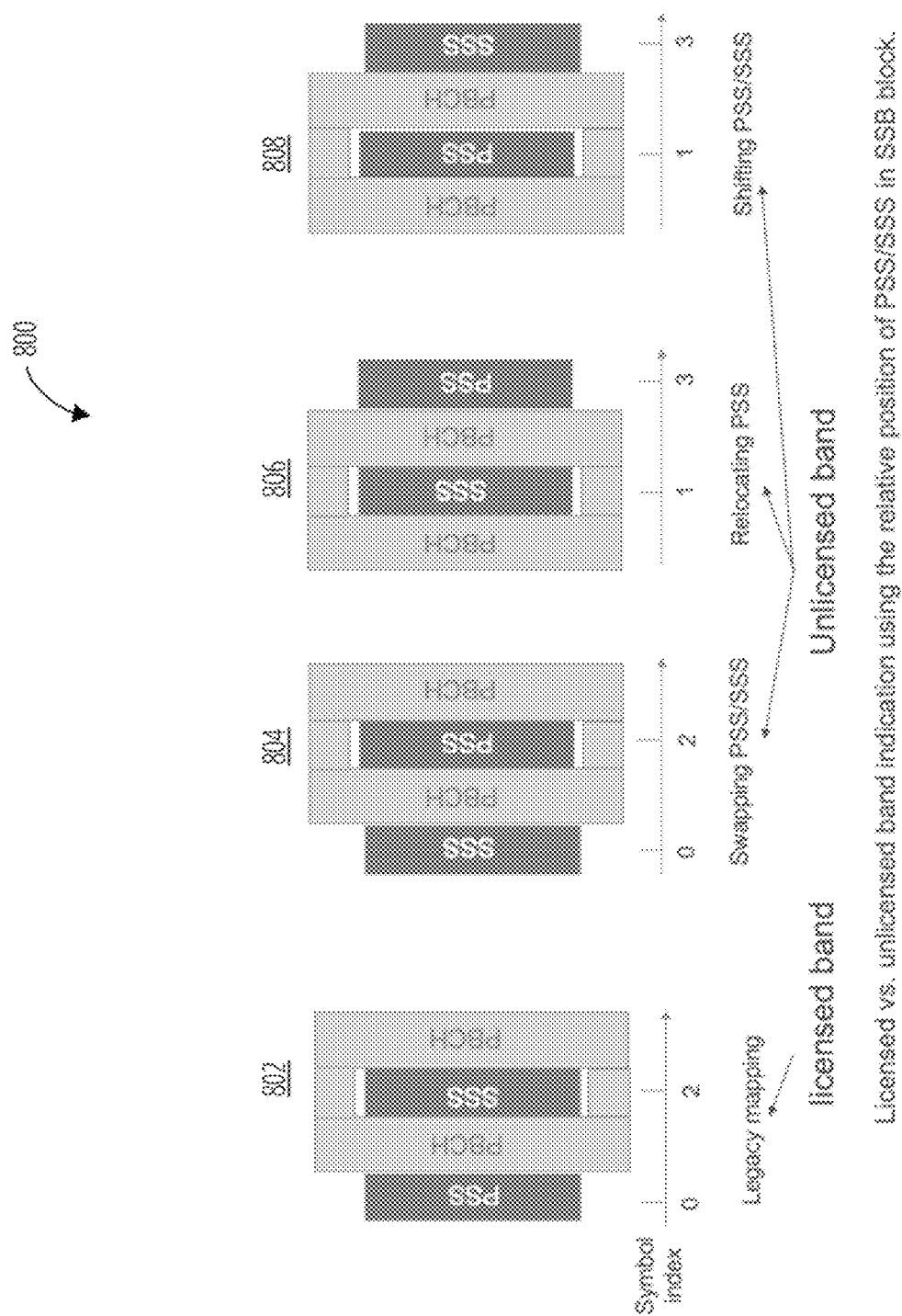
FIG. 8 is a block diagram of four Synchronization Signal Block (SSB) variants, in accordance with one embodiment.

For example, FIG. 8 shows four SSB variants 800. A first, legacy mapping variant 802 indicates a licensed band configuration because PSS and SSS are at symbol locations zero and two, respectively. Second, third, and fourth variants have different locations for PSS and SSS compared to legacy mapping variant 802 and therefore indicate an unlicensed band configuration. For instance, a swapped variant 804 indicates an unlicensed band configuration because SSS and PSS are at symbol locations zero and two, respectively. A third, relocated variant 806 indicates an unlicensed band configuration because SSS and PSS are at symbol locations one and three, respectively. A fourth, shifted variant 808 indicates an unlicensed band configuration because PSS and SSS are at symbol locations one and three, respectively.

According to an eighth embodiment, a UE makes two hypothetical assumptions as to the MIB content, i.e., licensed and unlicensed, for Type0-PDCCH configuration determination. The MIB content, for instance, may differ in terms of the resource block (RB) offset between the smallest RB index of the Type0-PDCCH search space to the smallest RB index of the detected SS/PBCH block. Then, based on the outcome of SIB1 decoding, i.e., whether SIB1 message is detected by UE assuming different RB offsets between Type0-PDCCH and SS/PBCH block, the UE can determine the frequency property, i.e., licensed or unlicensed.

For example, FIG. 9 shows RRC parameters 900 defining a MIB 902. MIB 902 includes pdcch-ConfigSIB1 904 indicating the location and resources for CotrolResourceSetZero (CORSET #0) on the resource grid where the UE may search for the Type0-PDCCH common search space to acquire the SIB1 information. In other words, MIB 902 provides the UE with parameters (e.g., CORESET #0 configuration) for acquiring SIB1 and, more specifically, information for monitoring of PDCCH for scheduling PDSCH that carries SIB1. If the UE makes an assumption about MIB contents based on a licensed configuration, but the MIB contents are based on an unlicensed configuration, then the SIB1 cannot be acquired under that improper assumption and, perforce, the UE determines that an unlicensed configuration is the proper assumption.

An improper assumption results in added power consumption at UE side when attempting initial access for overlapping band. However, it is straightforward to implement.

Figure 10:
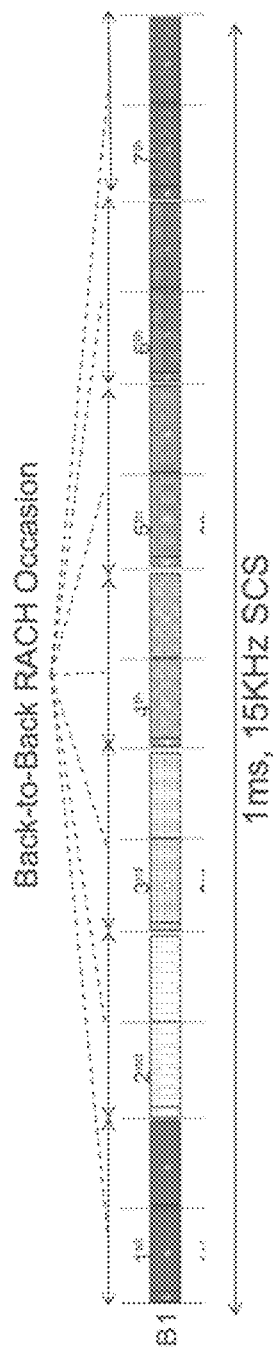
FIG. 10 is a diagram showing Random Access Channel (RACH) Occasions (ROs), in accordance with one embodiment.

Rel-15 NR on licensed band supports back-to-back (consecutive) ROs in the time domain. For example, FIG. 10 shows an example of 2-symbols PRACH format B1 configuration with seven ROs within one PRACH slot, which maximizes resource utilization in uplink (UL) and works well for licensed operation.

For Rel-16 NR-U transmission, Listen-Before-Talk (LBT) procedure is mandatorily performed before commencing RACH transmission in order to avoid collision and causing severe interference to ongoing transmission. Due to the contiguous back-to-back ROs spreading over the entire PRACH slot, RACH transmission blockage (e.g., a third RO) may occur for a UE due to the transmission of neighborhood UEs in the preceding RO (e.g., a second RO). Therefore, blockage results in the initial access latency increase and resource wastage. Disclosed are several embodiments addressing the latency and resource underutilization issue attributable to RACH transmission blockages in an initial access procedure for NR-U operation in a 5G wireless communication system.

Figure 11:
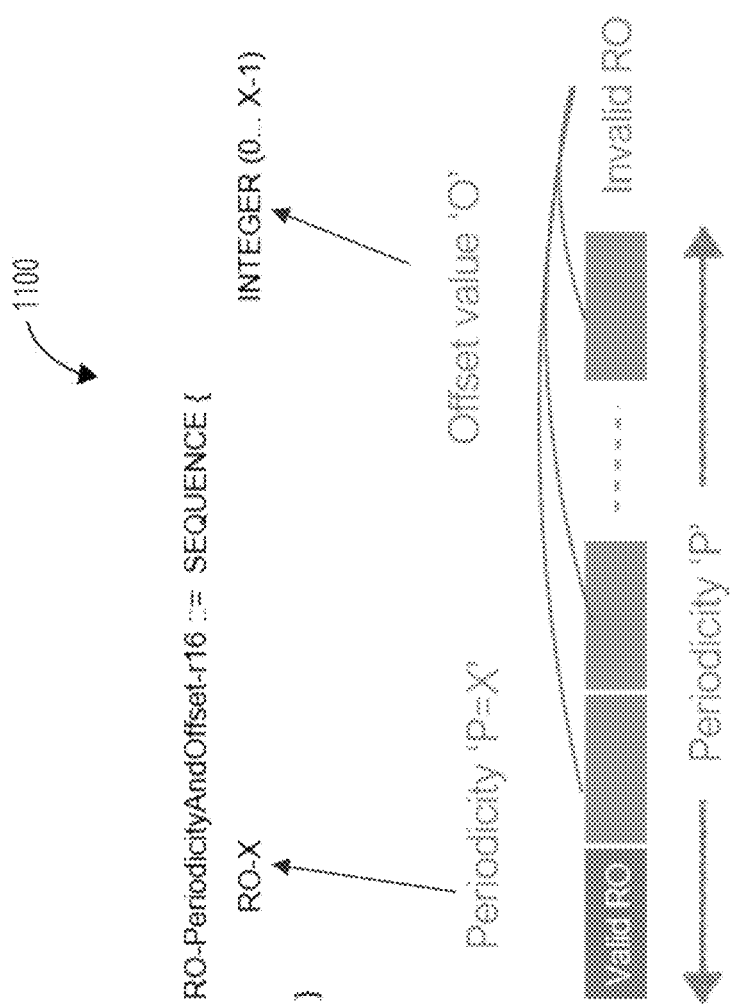
FIG. 11 is an Abstract Syntax Notation One (ASN.1) structure for joint encoding periodicity and offset parameters for ROs in a slot of a Physical Random Access Channel (PRACH), in accordance with one embodiment.

According to a first embodiment, a discontinuous (non-consecutive) RO time resource is specified based on the Rel-15 (consecutive) RO pattern by introducing a new parameter. A UE receives from an NR node the parameter indicating that, from among a set of consecutive ROs, a subset of non-consecutive ROs valid for RACH transmission. The parameter is a so-called puncturing factor. The puncturing factor value 'P' indicates one in every 'P' back-to-back ROs configured by Rel-15 configuration is to be used for RO transmission for NR-U operation. Moreover, as shown in FIG. 11, in some designs, a parameter offset 'O' may be introduced to indicate the valid RO within 'P' ROs valid for PRACH transmission.

In one embodiment, the value of 'P' and offset value of 'O' may be jointly encoded and signaled using a single IE by higher layers. FIG. 11 provides an example of an ASN.1 structure of joint encoding 1100. For example, the field "RO-X" is encoded and X represents the periodicity (in valid-RO(s) per slot). Moreover, the integer value of the field is two when the value of the offset parameter 'O' is two. However, in FIG. 11, the offset value is shown in the block diagram O='0' such that first RO is selected as the valid resource for transmission.

Figure 12:
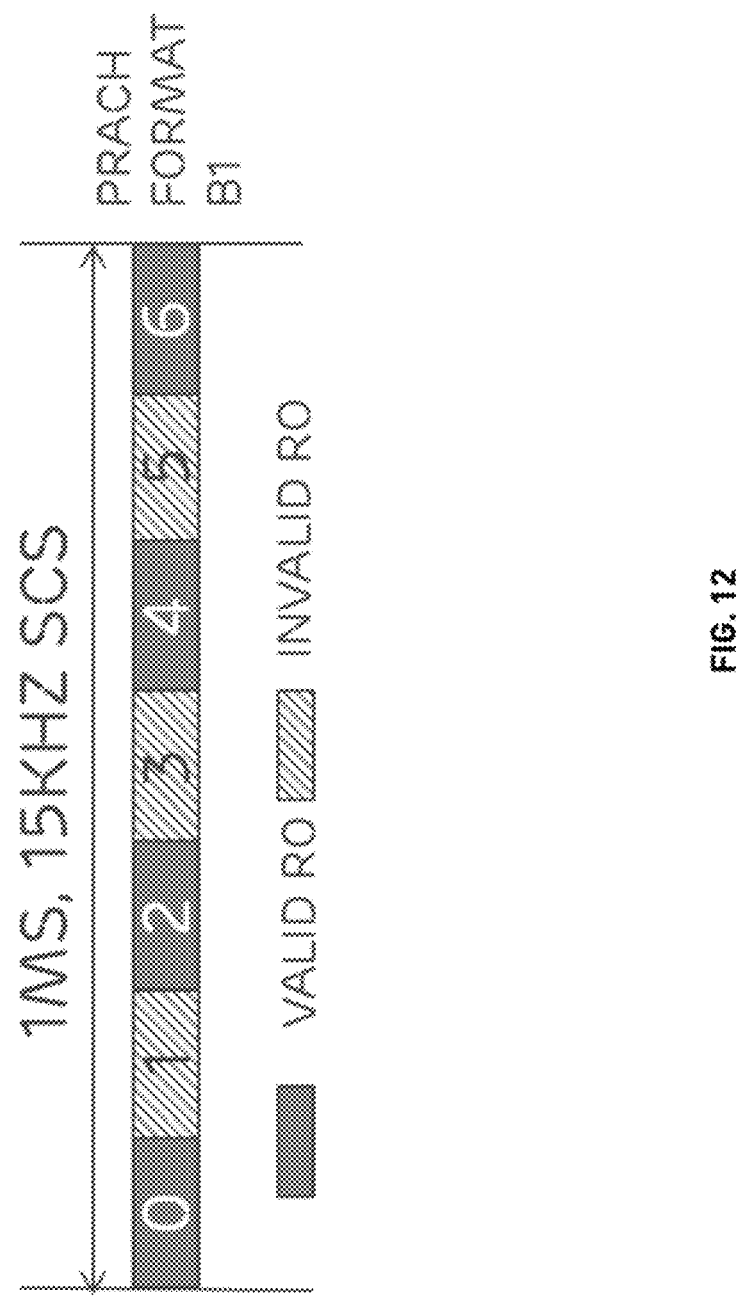
FIG. 12 is a PRACH diagram showing discontinuous ROs with setting "P=2 and O=0," in accordance with one embodiment.

FIG. 12 provides another example to show how the gap is created by puncturing one RO in every two back-to-back Rel-15 ROs, i.e., P=2 and O=1.

Skilled persons will appreciate that other signaling techniques may also be employed to indicate a gap in ROs. For instance, a gap can be signaled in a SIB. In another embodiment, a bitmap, for example, may be used to indicate which subset of ROs are available for NR-U operation.

Figure 13:
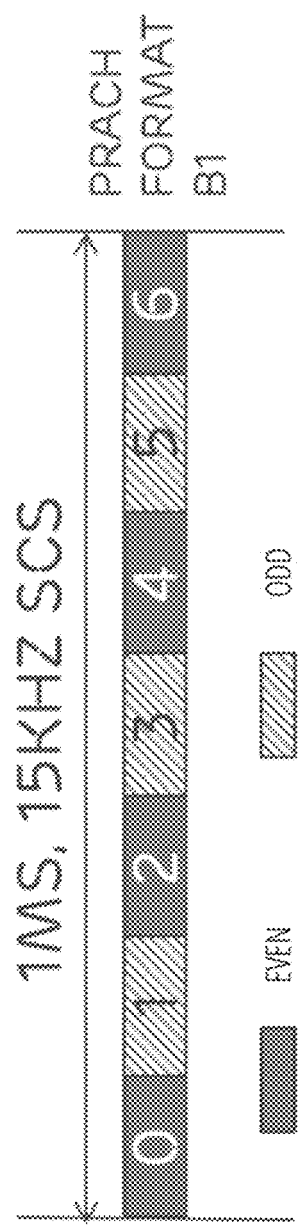
FIG. 13 is a PRACH diagram showing even and odd ROs, in accordance with one embodiment.

According to a second embodiment, FIG. 13 shows that, if operating on the unlicensed band or shared spectrum, even or odd numbered ROs within a PRACH slot are employed for the actual transmission. The selection of even or odd ROs may be configured by higher layers, e.g., SIB1, and hence can be employed for initial access procedure to validate the PRACH resources.

According to a third embodiment, the first X symbols or a portion of first or ending symbol of PRACH format may be punctured to create a gap for LBT operation. The symbol number X may be predefined in a specification. In some other designs, a set of X values may be predefined in specification and then one of these predefined values may be semi-statically configured in SIB1 information to provide more flexibility at gNB to determine the X value based on, e.g., cell size, and improve the UL resource efficiency.

Figure 14:
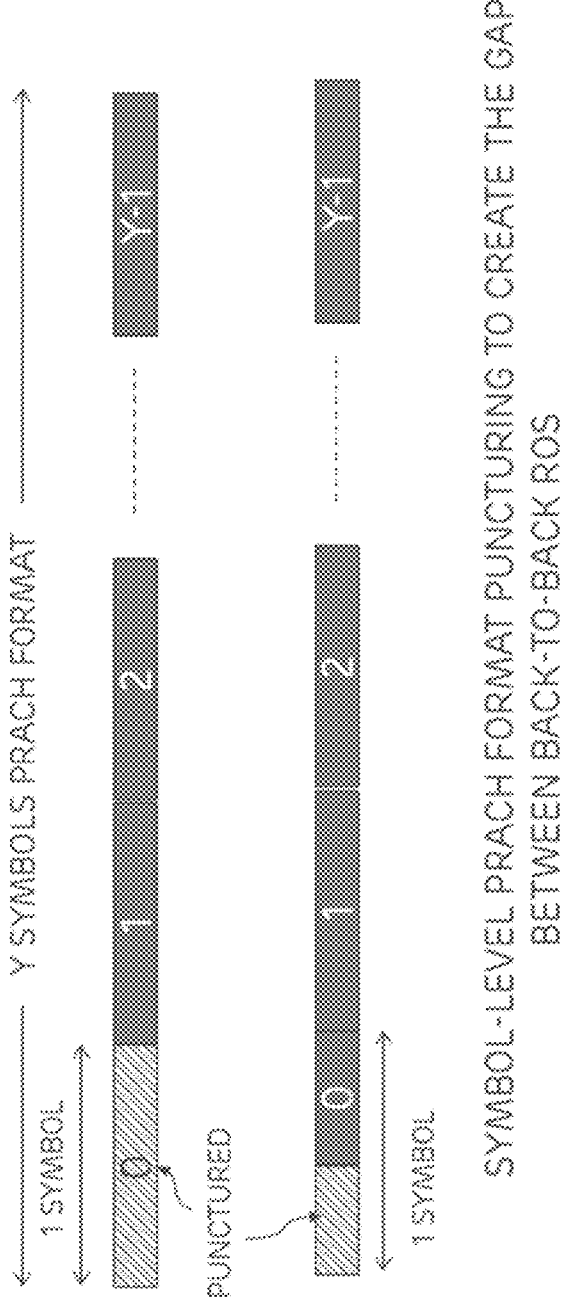
FIG. 14 is a PRACH diagram showing symbol puncturing, in accordance with one embodiment.

A top diagram of FIG. 14 provides an example of puncturing X=1 symbol for PRACH format with Y symbols. A bottom diagram of FIG. 14 shows another example of partially puncturing one symbol for smaller cell deployment scenario.

FIG. 15 is a block diagram illustrating components 1500, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1502 including one or more processors 1512 (or processor cores), one or more memory/storage devices 1518, and one or more communication resources 1520, each of which may be communicatively coupled via a bus 1522. For embodiments where node virtualization (e.g., NFV) is utilized, a hypervisor 1504 may be executed to provide an execution environment for one or more network slices/sub-slices to utilize the hardware resources 1502.

The processors 1512 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1514 and a processor 1516.

The memory/storage devices 1518 may include main memory, disk storage, or any suitable combination thereof. The memory/storage devices 1518 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1520 may include interconnection or network interface components or other suitable devices to communicate with one or more peripheral devices 1506 or one or more databases 1508 via a network 1510. For example, the communication resources 1520 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1524 may comprise software, a program, an application, an applet, an app, or other executable code for causing at least any of the processors 1512 to perform any one or more of the methodologies discussed herein. The instructions 1524 may reside, completely or partially, within at least one of the processors 1512 (e.g., within the processor's cache memory), the memory/storage devices 1518, or any suitable combination thereof. Furthermore, any portion of the instructions 1524 may be transferred to the hardware resources 1502 from any combination of the peripheral devices 1506 or the databases 1508. Accordingly, the memory of the processors 1512, the memory/storage devices 1518, the peripheral devices 1506, and the databases 1508 are examples of computer-readable and machine-readable media.

FIG. 16 illustrates an example architecture of a system 1600 of a network, in accordance with various embodiments. The following description is provided for an example system 1600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 16, the system 1600 includes UE 1602 and UE 1604. In this example, the UE 1602 and the UE 1604 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1602 and/or the UE 1604 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1602 and UE 1604 may be configured to connect, for example, communicatively couple, with an access node or radio access node (shown as (R)AN 1616). In embodiments, the (R)AN 1616 may be an NG RAN or a 5G RAN, an E-UTRAN, or a legacy RAN, such as a UTRAN or GERAN. As used herein, the term "NG RAN" or the like may refer to a (R)AN 1616 that operates in an NR or 5G system, and the term "E-UTRAN" or the like may refer to a (R)AN 1616 that operates in an LTE or 4G system. The UE 1602 and UE 1604 utilize connections (or channels) (shown as connection 1606 and connection 1608, respectively), each of which comprises a physical communications interface or layer (discussed in further detail below).

In this example, the connection 1606 and connection 1608 are air interfaces to enable communicative coupling, and can be consistent with cellular communications protocols, such as a GSM protocol, a CDMA network protocol, a PTT protocol, a POC protocol, a UNITS protocol, a 3GPP LTE protocol, a 5G protocol, a NR protocol, and/or any of the other communications protocols discussed herein. In embodiments, the UE 1602 and UE 1604 may directly exchange communication data via a ProSe interface 1610. The ProSe interface 1610 may alternatively be referred to as a sidelink (SL) interface 110 and may comprise one or more logical channels, including but not limited to a PSCCH, a PSSCH, a PSDCH, and a PSBCH.

The UE 1604 is shown to be configured to access an AP 1612 (also referred to as "WLAN node," "WLAN," "WLAN Termination," "WT" or the like) via connection 1614. The connection 1614 can comprise a local wireless connection, such as a connection consistent with any IEEE 802.11 protocol, wherein the AP 1612 would comprise a wireless fidelity (Wi-Fi®) router. In this example, the AP 1612 may be connected to the Internet without connecting to the core network of the wireless system (described in further detail below). In various embodiments, the UE 1604, (R)AN 1616, and AP 1612 may be configured to utilize LWA operation and/or LWIP operation. The LWA operation may involve the UE 1604 in RRC_CONNECTED being configured by the RAN node 1618 or the RAN node 1620 to utilize radio resources of LTE and WLAN. LWIP operation may involve the UE 1604 using WLAN radio resources (e.g., connection 1614) via IPsec protocol tunneling to authenticate and encrypt packets (e.g., IP packets) sent over the connection 1614. IPsec tunneling may include encapsulating the entirety of original IP packets and adding a new packet header, thereby protecting the original header of the IP packets.

The (R)AN 1616 can include one or more AN nodes, such as RAN node 1618 and RAN node 1620, that enable the connection 1606 and connection 1608. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs, or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 1600 (e.g., an eNB). According to various embodiments, the RAN node 1618 or RAN node 1620 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1618 or RAN node 1620 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1618 or RAN node 1620); a MAC/PHY split wherein RRC, PDCP, RLC, and MAC layers are operated by the CRAN/vBBUP and the PHY layer is operated by individual RAN nodes (e.g., RAN node 1618 or RAN node 1620); or a "lower PHY" split wherein RRC, PDCP, RLC, MAC layers and upper portions of the PHY layer are operated by the CRAN/vBBUP and lower portions of the PHY layer are operated by individual RAN nodes.

This virtualized framework allows the freed-up processor cores of the RAN node 1618 or RAN node 1620 to perform other virtualized applications. In some implementations, an individual RAN node may represent individual gNB-DUs that are connected to a gNB-CU via individual F1 interfaces (not shown by FIG. 16). In these implementations, the gNB-DUs may include one or more remote radio heads or RFEMs, and the gNB-CU may be operated by a server that is located in the (R)AN 1616 (not shown) or by a server pool in a similar manner as the CRAN/vBBUP. Additionally, or alternatively, one or more of the RAN node 1618 or RAN node 1620 may be next generation eNBs (ng-eNBs), which are RAN nodes that provide E-UTRA user plane and control plane protocol terminations toward the UE 1602 and UE 1604, and are connected to an SGC via an NG interface (discussed infra). In V2X scenarios one or more of the RAN node 1618 or RAN node 1620 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 1618 and/or the RAN node 1620 can terminate the air interface protocol and can be the first point of contact for the UE 1602 and UE 1604. In some embodiments, the RAN node 1618 and/or the RAN node 1620 can fulfill various logical functions for the (R)AN 1616 including, but not limited to, radio network controller (RNC) functions such as radio bearer management, uplink and downlink dynamic radio resource management and data packet scheduling, and mobility management.

In embodiments, the UE 1602 and UE 1604 can be configured to communicate using OFDM communication signals with each other or with the RAN node 1618 and/or the RAN node 1620 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1618 and/or the RAN node 1620 to the UE 1602 and UE 1604, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1602 and UE 1604 and the RAN node 1618 and/or the RAN node 1620 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1602 and UE 1604 and the RAN node 1618 or RAN node 1620 may operate using LAA, eLAA, and/or feLAA mechanisms. In these implementations, the UE 1602 and UE 1604 and the RAN node 1618 or RAN node 1620 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1602 and UE 1604, RAN node 1618 or RAN node 1620, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1602, AP 1612, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1602 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 1602 and UE 1604. The PDCCH carries information about the transport format and resource allocations related to the PDSCH channel, among other things. It may also inform the UE 1602 and UE 1604 about the transport format, resource allocation, and HARQ information related to the uplink shared channel. Typically, downlink scheduling (assigning control and shared channel resource blocks to the UE 1604 within a cell) may be performed at any of the RAN node 1618 or RAN node 1620 based on channel quality information fed back from any of the UE 1602 and UE 1604. The downlink resource assignment information may be sent on the PDCCH used for (e.g., assigned to) each of the UE 1602 and UE 1604.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more EC CEs. Similar to above, each ECCE may correspond to nine sets of four physical resource elements known as an EREGs. An ECCE may have other numbers of EREGs in some situations.

The RAN node 1618 or RAN node 1620 may be configured to communicate with one another via interface 1622. In embodiments where the system 1600 is an LTE system (e.g., when CN 1630 is an EPC), the interface 1622 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1602 from an SeNB for user data; information of PDCP PDUs that were not delivered to a UE 1602; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1600 is a 5G or NR system (e.g., when CN 1630 is an 5GC), the interface 1622 may be an Xn interface. The Xn interface is defined between two or more RAN nodes (e.g., two or more gNBs and the like) that connect to 5GC, between a RAN node 1618 (e.g., a gNB) connecting to 5GC and an eNB, and/or between two eNBs connecting to 5GC (e.g., CN 1630). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1602 in a connected mode (e.g., CM-CONNECTED) including functionality to manage the UE mobility for connected mode between one or more RAN node 1618 or RAN node 1620. The mobility support may include context transfer from an old (source) serving RAN node 1618 to new (target) serving RAN node 1620; and control of user plane tunnels between old (source) serving RAN node 1618 to new (target) serving RAN node 1620. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1616 is shown to be communicatively coupled to a core network-in this embodiment, CN 1630. The CN 1630 may comprise one or more network elements 1632, which are configured to offer various data and telecommunications services to customers/subscribers (e.g., users of UE 1602 and UE 1604) who are connected to the CN 1630 via the (R)AN 1616. The components of the CN 1630 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1630 may be referred to as a network slice, and a logical instantiation of a portion of the CN 1630 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1634 may be an element offering applications that use IP bearer resources with the core network (e.g., UMTS PS domain, LTE PS data services, etc.). The application server 1634 can also be configured to support one or more communication services (e.g., VoIP sessions, PTT sessions, group communication sessions, social networking services, etc.) for the UE 1602 and UE 1604 via the EPC. The application server 1634 may communicate with the CN 1630 through an IP communications interface 1636.

In embodiments, the CN 1630 may be an 5GC, and the (R)AN 116 may be connected with the CN 1630 via an NG interface 1624. In embodiments, the NG interface 1624 may be split into two parts, an NG user plane (NG-U) interface 1626, which carries traffic data between the RAN node 1618 or RAN node 1620 and a UPF, and the S1 control plane (NG-C) interface 1628, which is a signaling interface between the RAN node 1618 or RAN node 1620 and AMFs.

In embodiments, the CN 1630 may be a 5G CN, while in other embodiments, the CN 1630 may be an EPC). Where CN 1630 is an EPC, the (R)AN 116 may be connected with the CN 1630 via an S1 interface 1624. In embodiments, the S1 interface 1624 may be split into two parts, an S1 user plane (S1-U) interface 1626, which carries traffic data between the RAN node 1618 or RAN node 1620 and the S-GW, and the S1-MME interface 1628, which is a signaling interface between the RAN node 1618 or RAN node 1620 and MMES.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method, performed by a user equipment (UE) to facilitate initial access in a fifth generation (5G) new radio (NR) wireless communication system having an NR node, of differentiating between licensed and unlicensed bands in a common portion of frequency spectrum, the method comprising: receiving frequency configuration information from the NR node, the frequency configuration information indicating whether the common portion of frequency spectrum is allocated as a licensed band or an unlicensed band; and processing the frequency configuration information to determine that the frequency spectrum is configured as the licensed band or unlicensed band so as to facilitate initial access.

Example 2 is the method of Example 1 in which the receiving comprises receiving a Master Information Block (MIB) including an Information Element that acts as the frequency configuration information.

Example 3 is the method of Example 2 in which the Information Element is a bitfield in the MIB having first and second values, the first value representing the frequency spectrum is configured as the licensed band and the second value representing that the frequency spectrum is configured as the unlicensed band.

Example 4 is the method of Example 1 in which the frequency configuration information comprises a Cyclic Redundancy Code (CRC) mask applied to a Physical Broadcast Channel (PBCH), and the processing comprises attempting to decode the PBCH using values of the CRC mask corresponding to one of the licensed or unlicensed bands.

Example 5 is the method of Example 1 in which the frequency configuration information comprises different non-overlapping Global Synchronization Channel Numbers (GSCNs).

Example 6 is the method of Example 1 in which the wireless communication system comprises a primary cell (PCell) and a secondary cell (SCell), and the receiving comprises receiving the frequency configuration information as dedicated Radio Resource Control (RRC) signaling after the PCell is configured.

Example 7 is the method of Example 1 in which the frequency configuration information is represented by (1,1) values of $$\bar{a}_{\bar{A}+6}, \bar{a}_{\bar{A}+7}$$

bits in a Physical Broadcast Channel (PBCH) payload.

Example 8 is the method of Example 1 in which the frequency configuration information is indicated through a Demodulation Reference Signal (DMRS) sequence of a Physical Broadcast Channel (PBCH).

Example 9 is the method of Example 1 in which the frequency configuration information is represented based on a position of a Primary Synchronization Signal (PSS) detected in symbol index zero.

Example 10 is the method of Example 1 in which the frequency configuration information is indicated through Master Information Block (MIB) content, the method further comprising making a hypothetical assumption as to the MIB content used for System Information Block (SIB) detection to determine that the frequency spectrum is configured as the licensed band or unlicensed band based on whether the hypothetical assumption results in successful SIB detection.

Example 11 is a non-transitory computer-readable storage medium of a user equipment (UE) configured to facilitate, in a fifth generation (5G) new radio (NR) wireless communication system having an NR node, initial access by differentiation between licensed and unlicensed bands in a common portion of frequency spectrum, the computer-readable storage medium including instructions that when executed by a processor, cause the processor to: receive from an NR node frequency configuration information, the frequency configuration information indicating whether the common portion of frequency spectrum is allocated as a licensed band or an unlicensed band; and process the frequency configuration information to determine that the frequency spectrum is configured as the licensed band or unlicensed band so as to facilitate initial access.

Example 12 is the computer-readable storage medium of Example 11 in which the frequency configuration information comprises a Master Information Block (MIB) having an Information Element identifying the frequency spectrum is configured as one of the licensed band and unlicensed band.

Example 13 is the computer-readable storage medium of Example 11 in which the frequency configuration information comprises a Cyclic Redundancy Code (CRC) mask applied to a Physical Broadcast Channel (PBCH).

Example 14 is the computer-readable storage medium of Example 11 in which the frequency configuration information comprises different non-overlapping Global Synchronization Channel Numbers (GSCNs).

Example 15 is the computer-readable storage medium of Example 11 in which the wireless communication system comprises a primary cell (PCell) and a secondary cell (SCell), and the frequency configuration information is a dedicated Radio Resource Control (RRC) signal received after the PCell is configured.

Example 16 is the computer-readable storage medium of Example 11 in which the frequency configuration information is represented by (1,1) values of $$\bar{a}_{\bar{A}+6}, \bar{a}_{\bar{A}+7}$$

bits in a Physical Broadcast Channel (PBCH) payload.

Example 17 is the computer-readable storage medium of Example 11 in which the frequency configuration information is indicated through a Demodulation Reference Signal (DMRS) sequence of a Physical Broadcast Channel (PBCH).

Example 18 is the computer-readable storage medium of Example 11 in which the frequency configuration information is represented based on a position of a Primary Synchronization Signal (PSS) detected in symbol index zero.

Example 19 is the computer-readable storage medium of Example 11 in which the frequency configuration information is indicated through Master Information Block (MIB) content, the instructions further cause the processor to make a hypothetical assumption as to the MIB content used for System Information Block (SIB) detection to determine that the frequency spectrum is configured as the licensed band or unlicensed band based on whether the hypothetical assumption results in successful SIB detection.

Example 20 is a method, performed by a gNB to facilitate initial access of a user equipment (UE) in a fifth generation (5G) new radio (NR) wireless communication system, of indicating which one of a licensed band and unlicensed band is configured in a common portion of frequency spectrum, the method comprising: generating frequency configuration information indicating whether the common portion of frequency spectrum is allocated as a licensed band or an unlicensed band; and providing to the UE the frequency configuration information to facilitate the initial access.

Example 21 is the method of Example 20 in which the providing comprises transmitting a Master Information Block (MIB) including an Information Element that acts as the frequency configuration information.

Example 22 is the method of Example 21 in which the Information Element is a bitfield in the MIB having first and second values, the first value representing the frequency spectrum is configured as the licensed band and the second value representing that the frequency spectrum is configured as the unlicensed band.

Example 23 is the method of Example 20 in which the frequency configuration information comprises a Cyclic Redundancy Code (CRC) mask applied to a Physical Broadcast Channel (PBCH).

Example 24 is the method of Example 20 in which the frequency configuration information comprises different non-overlapping Global Synchronization Channel Numbers (GSCNs).

Example 25 is the method of Example 20 in which the wireless communication system comprises a primary cell (PCell) and a secondary cell (SCell), and the generating comprises signaling the frequency configuration information as dedicated Radio Resource Control (RRC) message after the PCell is configured.

Example 26 is the method of Example 20 in which the frequency configuration information is represented by (1,1) values of $$\bar{a}_{\bar{A}+6}\,\bar{a}_{\bar{A}+7}$$

bits in a Physical Broadcast Channel (PBCH) payload.

Example 27 is the method of Example 20 in which the frequency configuration information is indicated through a Demodulation Reference Signal (DMRS) sequence of a Physical Broadcast Channel (PBCH).

Example 28 is the method of Example 20 in which the frequency configuration information is represented based on a position of a Primary Synchronization Signal (PSS) detected in symbol index zero.

Example 29 is the method of Example 20 in which the frequency configuration information is indicated through Master Information Block (MIB) content.

Example 30 may include an apparatus comprising means to perform one or more elements of a method described in or related to any of the above Examples, or any other method or process described herein.

Example 31 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 32 may include an apparatus comprising logic, modules, or circuitry to perform one or more elements of a method described in or related to any of the above Examples, or any other method or process described herein.

Example 33 may include a method, technique, or process as described in or related to any of the above Examples, or portions or parts thereof.

Example 34 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 35 may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 36 may include a signal encoded with data as described in or related to any of the above Examples, or portions or parts thereof, or otherwise described in the present disclosure.

Example 37 may include a signal encoded with a datagram, packet, frame, segment, PDU, or message as described in or related to any of the above Examples, or portions or parts thereof, or otherwise described in the present disclosure.

Example 38 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 39 may include a computer program comprising instructions, wherein execution of the program by a processing element is to cause the processing element to carry out the method, techniques, or process as described in or related to any of the above Examples, or portions thereof.

Example 40 may include a signal in a wireless network as shown and described herein.

Example 41 may include a method of communicating in a wireless network as shown and described herein.

Example 42 may include a system for providing wireless communication as shown and described herein.

Example 43 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method, performed by a user equipment (UE) to facilitate initial access in a fifth generation (5G) new radio (NR) wireless communication system having an NR node, of differentiating between licensed and unlicensed bands in a common portion of frequency spectrum, the method comprising:
   receiving frequency configuration information from the NR node, the frequency configuration information indicating whether the common portion of frequency spectrum is allocated as a licensed band or an unlicensed band, wherein receiving comprises receiving a Master Information Block (MIB) including an Information Element that acts as the frequency configuration information, and wherein the Information Element is a bitfield in the MIB having first and second values, the first value representing the frequency spectrum is configured as the licensed band and the second value representing that the frequency spectrum is configured as the unlicensed band; and
   processing the frequency configuration information to determine that the frequency spectrum is configured as the licensed band or unlicensed band so as to facilitate initial access.

2. The method of claim 1 in which the receiving comprises receiving a Master Information Block (MIB) including an Information Element that acts as the frequency configuration information.

3. The method of claim 1 in which the frequency configuration information comprises a Cyclic Redundancy Code (CRC) mask applied to a Physical Broadcast Channel (PBCH), and the processing comprises attempting to decode the PBCH using values of the CRC mask corresponding to one of the licensed or unlicensed bands.

4. The method of claim 1 in which the frequency configuration information comprises different non-overlapping Global Synchronization Channel Numbers (GSCNs).

5. The method of claim 1 in which the wireless communication system comprises a primary cell (PCell) and a secondary cell (SCell), and the receiving comprises receiving the frequency configuration information as dedicated Radio Resource Control (RRC) signaling after the PCell is configured.

6. The method of claim 1 in which the frequency configuration information is represented by (1,1) values of $$\bar{a}_{\bar{A}+6}\bar{a}_{\bar{A}+7}$$

bits in a Physical Broadcast Channel (PBCH) payload.

7. The method of claim 1 in which the frequency configuration information is indicated through a Demodulation Reference Signal (DMRS) sequence of a Physical Broadcast Channel (PBCH).

8. The method of claim 1 in which the frequency configuration information is represented based on a position of a Primary Synchronization Signal (PSS) detected in symbol index zero.

9. The method of claim 1 in which the frequency configuration information is indicated through Master Information Block (MIB) content, the method further comprising making a hypothetical assumption as to the MIB content used for System Information Block (SIB) detection to determine that the frequency spectrum is configured as the licensed band or unlicensed band based on whether the hypothetical assumption results in successful SIB detection.

10. A non-transitory computer-readable storage medium of a user equipment (UE) configured to facilitate, in a fifth generation (5G) new radio (NR) wireless communication system having an NR node, initial access by differentiation between licensed and unlicensed bands in a common portion of frequency spectrum, the computer-readable storage medium including instructions that when executed by a processor, cause the processor to:
   receive from an NR node frequency configuration information, the frequency configuration information indicating whether the common portion of frequency spectrum is allocated as a licensed band or an unlicensed band, wherein the frequency configuration information is represented by (1,1) values of $$\bar{a}_{\bar{A}+6}\bar{a}_{\bar{A}+7}$$

bits in a Physical Broadcast Channel (PBCH) payload; and
   process the frequency configuration information to determine that the frequency spectrum is configured as the licensed band or unlicensed band so as to facilitate initial access.

11. The computer-readable storage medium of claim 10 in which the frequency configuration information comprises a Master Information Block (MIB) having an Information Element identifying the frequency spectrum is configured as one of the licensed band and unlicensed band.

12. The computer-readable storage medium of claim 10 in which the frequency configuration information comprises a Cyclic Redundancy Code (CRC) mask applied to a Physical Broadcast Channel (PBCH).

13. The computer-readable storage medium of claim 10 in which the frequency configuration information comprises different non-overlapping Global Synchronization Channel Numbers (GSCNs).

14. The computer-readable storage medium of claim 10 in which the wireless communication system comprises a primary cell (PCell) and a secondary cell (SCell), and the frequency configuration information is a dedicated Radio Resource Control (RRC) signal received after the PCell is configured.

15. The computer-readable storage medium of claim 10 in which the frequency configuration information is indicated through a Demodulation Reference Signal (DMRS) sequence of a Physical Broadcast Channel (PBCH).

16. The computer-readable storage medium of claim 10 in which the frequency configuration information is represented based on a position of a Primary Synchronization Signal (PSS) detected in symbol index zero.

17. The computer-readable storage medium of claim 10 in which the frequency configuration information is indicated through Master Information Block (MIB) content, the instructions further cause the processor to make a hypothetical assumption as to the MIB content used for System Information Block (SIB) detection to determine that the frequency spectrum is configured as the licensed band or unlicensed band based on whether the hypothetical assumption results in successful SIB detection.

18. A method, performed by a gNB to facilitate initial access of a user equipment (UE) in a fifth generation (5G) new radio (NR) wireless communication system, of indicating which one of a licensed band and unlicensed band is configured in a common portion of frequency spectrum, the method comprising:

generating frequency configuration information indicating whether the common portion of frequency spectrum is allocated as a licensed band or an unlicensed band, wherein the frequency configuration information is represented by (1,1) values of $$\bar{a}_{\bar{A}+6}, \bar{a}_{\bar{A}+7}$$

bits in a Physical Broadcast Channel (PBCH) payload; and providing to the UE the frequency configuration information to facilitate the initial access.

* * * * *